United States Patent [19]
Narabu

[11] Patent Number: 6,081,255
[45] Date of Patent: Jun. 27, 2000

[54] POSITION DETECTION APPARATUS AND REMOTE CONTROL APPARATUS

[75] Inventor: Tadakuni Narabu, Kanagawa, Japan

[73] Assignee: Sony Corporation, Tokyo, Japan

[21] Appl. No.: 08/992,463

[22] Filed: Dec. 17, 1997

[30] Foreign Application Priority Data

Dec. 25, 1996 [JP] Japan ................................. 8-346117

[51] Int. Cl.[7] ................................ G09G 5/08; H04N 5/33
[52] U.S. Cl. .......................... 345/158; 345/157; 348/166
[58] Field of Search .................................. 345/156, 157, 345/158; 356/375, 141.1–141.5; 348/166, 265

[56] References Cited

U.S. PATENT DOCUMENTS

| | | | |
|---|---|---|---|
| 4,193,689 | 3/1980 | Reymond et al. | |
| 4,328,516 | 5/1982 | Colpack et al. | 348/166 |
| 4,480,918 | 11/1984 | De Fazio | 356/375 |
| 4,575,632 | 3/1986 | Lange | 348/166 |
| 4,639,774 | 1/1987 | Fried | 348/166 |
| 5,349,460 | 9/1994 | Ogasahara et al. | 359/142 |
| 5,396,282 | 3/1995 | Ogikubo | 348/166 |
| 5,448,261 | 9/1995 | Koike et al. | 345/156 |
| 5,499,098 | 3/1996 | Ogawa | 356/375 |
| 5,521,373 | 5/1996 | Lanier et al. | 250/203.2 |
| 5,587,583 | 12/1996 | Chin et al. | 348/166 |
| 5,627,565 | 5/1997 | Morishita et al. | 345/158 |
| 5,644,126 | 7/1997 | Ogawa | 250/231.1 |
| 5,907,405 | 5/1999 | Mizutani et al. | 356/375 |
| 5,920,395 | 7/1999 | Shulz | 356/375 |
| 5,926,168 | 7/1999 | Fan | 345/158 |
| 5,945,981 | 8/1999 | Paull et al. | 345/158 |

OTHER PUBLICATIONS

Patent Abstracts of Japan, vol. 15, No. 395, Oct. 7, 1991, JP 03 158705A, (Toshiba Corp.).

*Primary Examiner*—Richard A. Hjerpe
*Assistant Examiner*—Benjamin D. Bowers
*Attorney, Agent, or Firm*—Hill & Simpson

[57] ABSTRACT

An object of the present invention is to remote control a position of a cursor displayed on a display screen of a reception unit by means of two-dimensional/three-dimensional positioning of a transmission unit. Another object of the present invention is to select a function by operating an ON/OFF switch of the transmission unit.

A light emitted from a light source block of a transmission unit 10 is injected via a first optical block 13. A reception unit 20 receives the light from the transmission unit 10 via a second optical block 21 of a sensor block 22. A detection block 28 detects a light intensity according to an output from this sensor block. A control block 26 calculates a two-dimensional/three-dimensional position of the transmission unit 10 and displays the position as the cursor position on the display screen.

8 Claims, 23 Drawing Sheets

POSITION DETECTION APPARATUS AND REMOTE CONTROL APPARATUS

BACKGROUND OF THE INVENTION

1. Field of the Invention

The present invention relates to a position detection apparatus for receiving a light emitted from a light source and detecting the position of the light source and remote control apparatus for remote controlling a reception unit from a transmission unit having a light source and an ON/OFF switch.

2. Description of the Prior Art

Conventionally, there is provided a so-called cordless remote control unit for controlling at a distance an apparatus such as a television apparatus, a video tape recorder, a video disc player, a compact disc (CD) player, an audio tape recorder and the like.

The aforementioned remote control unit consists of: a transmission unit having an operation block where pushbuttons are arranged to be operated by a user and a light injection block for modulating a data entered by the user through a pushbutton, using a light such as infrared rays as a medium to be injected; and a reception unit for receiving the light injected from the transmission unit and demodulating the light so as to carry out a corresponding operation. The transmission unit and the reception unit are electrically separated from each other and normally used at spatially distant positions.

FIG. 1 schematically shows the aforementioned transmission unit 10. The transmission unit 10 has a casing of an approximately flat rectangular parallelepiped shape. This casing has a size convenient to be grasped by a hand of the user and has a main surface where an input operation block 11 and a plurality of pushbuttons are arranged. Moreover, a light injection block 13 is provided one of the faces opposing in the longitudinal direction of the casing of the transmission unit 10 so as to inject light in the longitudinal direction.

FIG. 2 schematically shows the aforementioned reception unit. The reception unit 20 is provided in a television image receiving apparatus and having a light detection block 72 arranged below a display block 27 for receiving and demodulating the light injected from the aforementioned transmission unit 10 so as to carry out a function selected by the operation of the operation block 11 of the transmission unit. For example, the channel of the television image receiving apparatus is changed from one to another or the sound volume is increased or decreased.

On the other hand, in a personal computer, a video game apparatus and the like, a pointing device is provided for specifying a position on a display screen such as CRT and a liquid crystal panel for selecting a function.

As the aforementioned point device, a mouse is provided. The mouse has a size convenient to be wrapped by a palm of a hand and can be moved on a flat surface such as a desk, and corresponding to the position of this mouse, a specified position is indicated by a cursor or the like on the aforementioned display screen. The mouse has one to three pushbuttons on the casing for entering an instruction such as selecting a function at the specified position.

Moreover, as the pointing device used for a video game apparatus, there is provided a unit having a casing on which an up, down, left, and right button and a pushbutton are arranged. In such a device, the aforementioned specified position is shifted by pressing the up, down, left, and right buttons and the distance to be shifted is adjusted by the length of time the corresponding button is kept pressed. A selection at the aforementioned specified position is carried out by pressing the pushbutton.

Furthermore, as the pointing device, there is provided a joystick. The joystick consists of a single lever which is supported by a gimbal mechanism. When the lever is inclined, according to the inclination direction and inclination angle, the aforementioned specified position indicated by a cursor or the like is moved on the aforementioned display screen. Moreover, in a case when the joystick is provided with a selection pushbutton, a function can be selected at the aforementioned specified position.

Here, FIG. 3 shows a joystick 100 disclosed in Japanese Patent Laid-Open Sho 61-276014 which has a light source block arranged on the lever 101 and having a light source 102, and a light reception block having a lens 103 for receiving the light injected from this light source block and a two-dimension light receiving element 104 for detecting the light.

The aforementioned joystick 100 is arranged as a unitary portion of a casing having approximately cubic configuration. The light source 102 is arranged at the lower end of the lever 101 and emits a light which is converged by the aforementioned lens 103 onto the aforementioned tow-dimensional light receiving element 104. This two-dimensional light receiving element 104 detects an operation of the lever 101 according to the position where the light is converged. Moreover, the joystick 100 moves the specified position indicated by a cursor or the like on the display screen according to the direction and the angle of the tilting of the lever 101.

So-called audio visual (AV) apparatuses such as a television image receiving apparatus, a video tape recorder, a video disc player, a CD player, and an audio tape recorder as well as personal computers and video game apparatuses are widely used by various users.

Since these apparatuses have a variety of functions and for an ordinary user having no technical knowledge, it may appear too much complicated to operate such apparatus. Moreover, because of the limit of the operation block, these apparatus may not exhibit sufficiently their functions available.

For example, in a so-called remote control unit used for operation of the aforementioned apparatuses at a distance, there should be a number of pushbuttons in order to sufficiently operate the function of the reception unit 20 which may be, for example, a television apparatus. However, if the number of pushbuttons is increased, the user cannot select the necessary one without taking time and care.

Moreover, in the case of the aforementioned mouse, it is necessary to provide a flat plane for operation of the mouse and to connect the mouse through a cord. There has been provided a so-called optical mouse which does not require a cord for connection, but the optical mouse requires a mouse pad dedicated to the optical mouse. Thus, the mouse including the optical mouse is inconvenient in comparison to the aforementioned remote control unit.

Moreover, in the unit having the up, down, left, and right buttons and the select buttons arranged on a casing, it is necessary to operate the four buttons and the select buttons. This cannot be said to be good in operationability.

Moreover, in the aforementioned joystick, a position is selected according to the direction and the angle of the lever provided on the joystick. That is, it is necessary to tilt the lever at a particular angle to move the specified position on the display, operation cannot be said to be easy and requires some training.

SUMMARY OF THE INVENTION

It is therefore an object of the present invention to provide a position detection apparatus for detecting a light emitted from a light source so as to detect the position of the light source. Another object of the present invention is to provide a remote control apparatus using the aforementioned position detection apparatus so as to enable to easily operate the aforementioned apparatuses.

In order to achieve the aforementioned object, the present invention provides position detection apparatus comprising: light receiving means consisting of at least two one-dimensional light receiving elements arranged in different directions from each other for receiving a light injected from a light source; and position detection processing means for detecting a two-dimensional position of the light source according to an output from the light receiving means.

The aforementioned position detection apparatus receives a light emitted from a light source by at least two one-dimensional light receiving elements arranged in different directions from each other in the light receiving means, so as to detect a position of the light source according to an output signal from the light receiving block.

Moreover, in the position detection apparatus according to the present invention, the one-dimensional light receiving elements may be arranged so as to intersect each other at a right angle or one of the one-dimensional light receiving elements may be divided into two equal portions so as to sandwich the center of the other light receiving element with a right angle, forming a cross-shaped configuration as a whole. Alternatively, the elements may intersect each other forming an angle other than a right angle.

As the aforementioned position detection apparatus has the light reception block in which at least two one-dimensional elements are arranged so as to intersect each other at a right angle, components are separated for each of the intersecting at a right angle directions of the two dimension. Moreover, since the one-dimensional light receiving elements are arranged in a cross shape, it is possible to detect an incident light from a nearer position. Alternatively, when the one-dimensional light receiving elements are arranged in directions intersecting each other at other than a right angle, components can be separated for each of the directions so as to be detected.

In the position detection apparatus according the present invention, the light receiving means includes three or more than three one-dimensional light receiving elements in which at least two elements are arranged in different directions; and the position detection processing means detects a three-dimensional position of the light source according to an output signal from the light receiving means.

In the aforementioned position detection apparatus, a light emitted from a light source is received by three or more than three one-dimensional light receiving elements which are provided in the light receiving means and in which at least two elements are arranged in different directions from each other, and a three-dimensional position of the light source is detected according to an output signal from this light receiving means.

In the position detection apparatus according to the present invention, the one-dimensional light receiving elements are made from one of CCD image pickup elements, BBD image pickup elements, and MOS image pickup elements.

The aforementioned position detection apparatus employs one of CCD image pickup elements, BBD image pickup elements, and MOS image pickup elements as the one-dimensional light receiving elements of the light receiving means.

According to another aspect of the present invention, there is provided a remote control apparatus comprising: a transmission block having a light source for emitting a light and an ON/OFF switch for turning on and off the light source; a light receiving block having at least two one-dimensional light receiving elements arranged in different directions from each other for receiving the light emitted from the transmission block; a position detection processing block for detecting a two-dimensional position of the transmission block according to an output from the light receiving block; and a display block for displaying on a display screen the two-dimensional position of the transmission block detected by the position detection processing block.

In the aforementioned remote control apparatus, a light from a light source which is turned on and off from the transmission block is received by the two one-dimensional light receiving elements arranged in different directions from each other in the light receiving block; a two-dimensional position of the transmission block is detected by the position detection block according to an output signal from the light receiving block; and the display block displays the two-dimensional position of the transmission block on the display screen.

Moreover, in the remote control apparatus according to the present invention, the light receiving block includes three or more than three one-dimensional light receiving elements in which at least two elements are arranged in different directions from each other; an output from these light receiving elements is used to detect a three-dimensional position of the transmission block; and the three-dimensional position detected by the reception block is converted into a signal for the display screen and displayed by the display block.

In the aforementioned remote control apparatus, the light receiving block includes three or more than three one-dimensional light receiving elements in which at least two elements are arranged in different directions from each other; an output signal from this light receiving block is used to detect a three-dimensional position of the transmission block; and this three-dimensional position is converted into a two-dimensional position so as to be displayed on the display screen of the display block.

DETAILED DESCRIPTION OF THE PREFERRED EMBODIMENT

Description will now be directed to a position detection apparatus and a remote control means according to an embodiment of the present invention with reference to the attached drawings.

Figure 1:
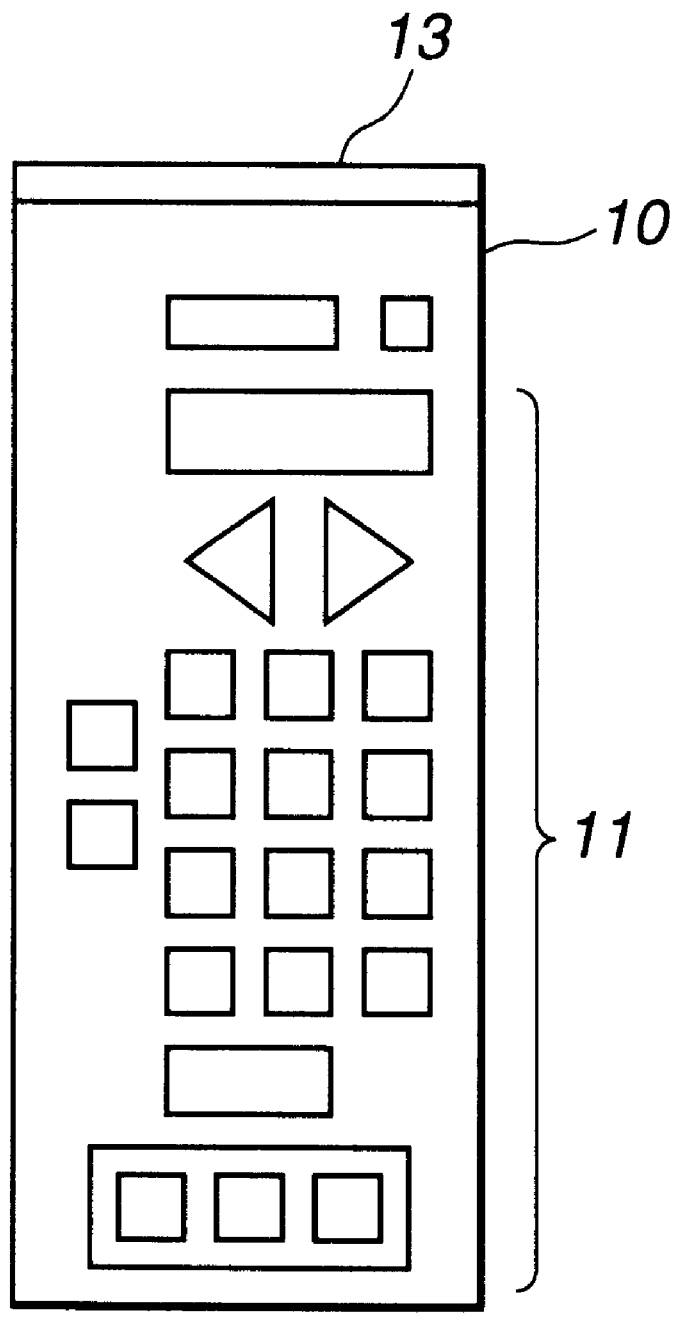
FIG. 1 is a plan view showing a conventional transmission unit.
Figure 2:
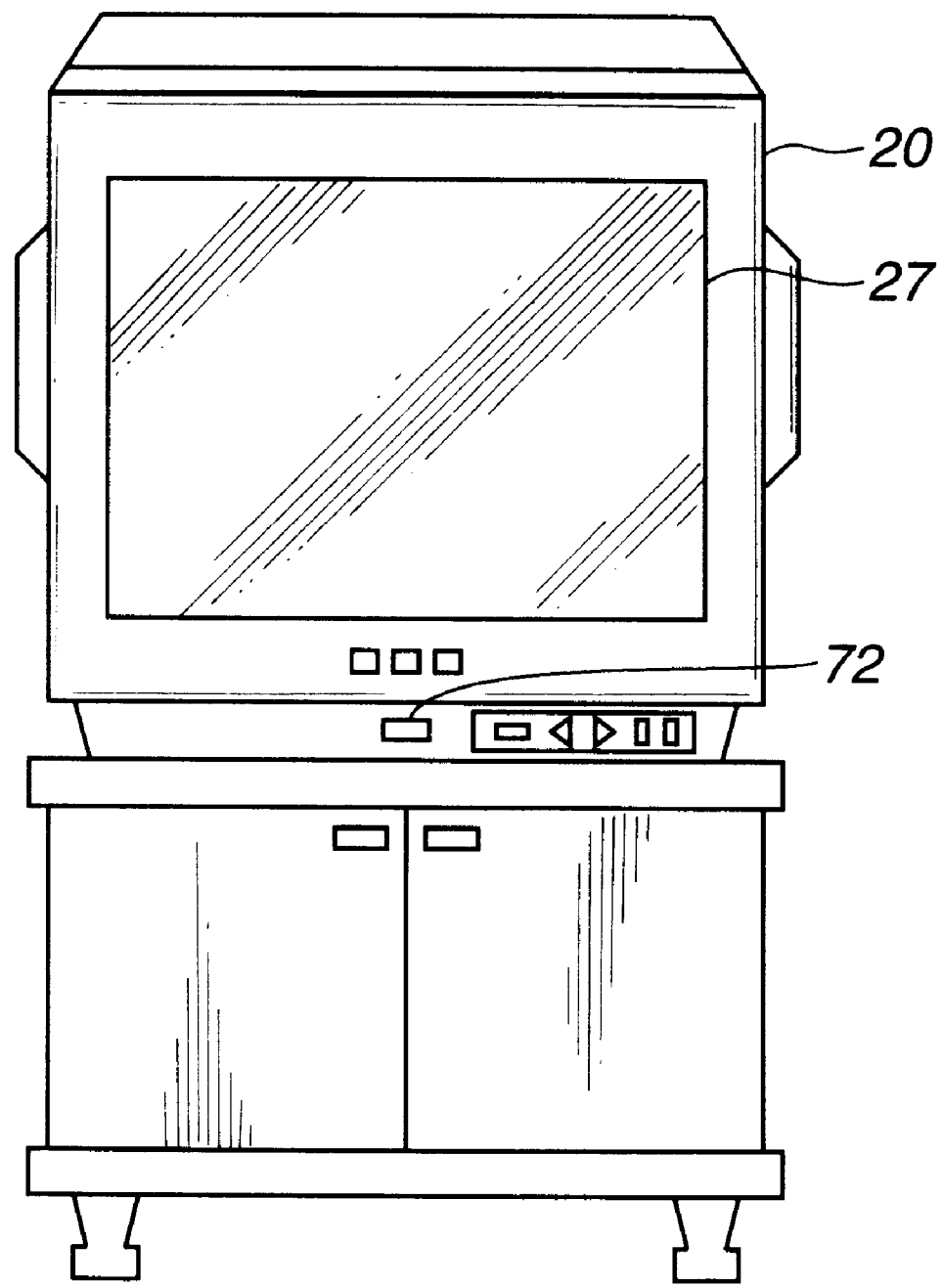
FIG. 2 is a plan view showing a conventional reception unit.
Figure 3:
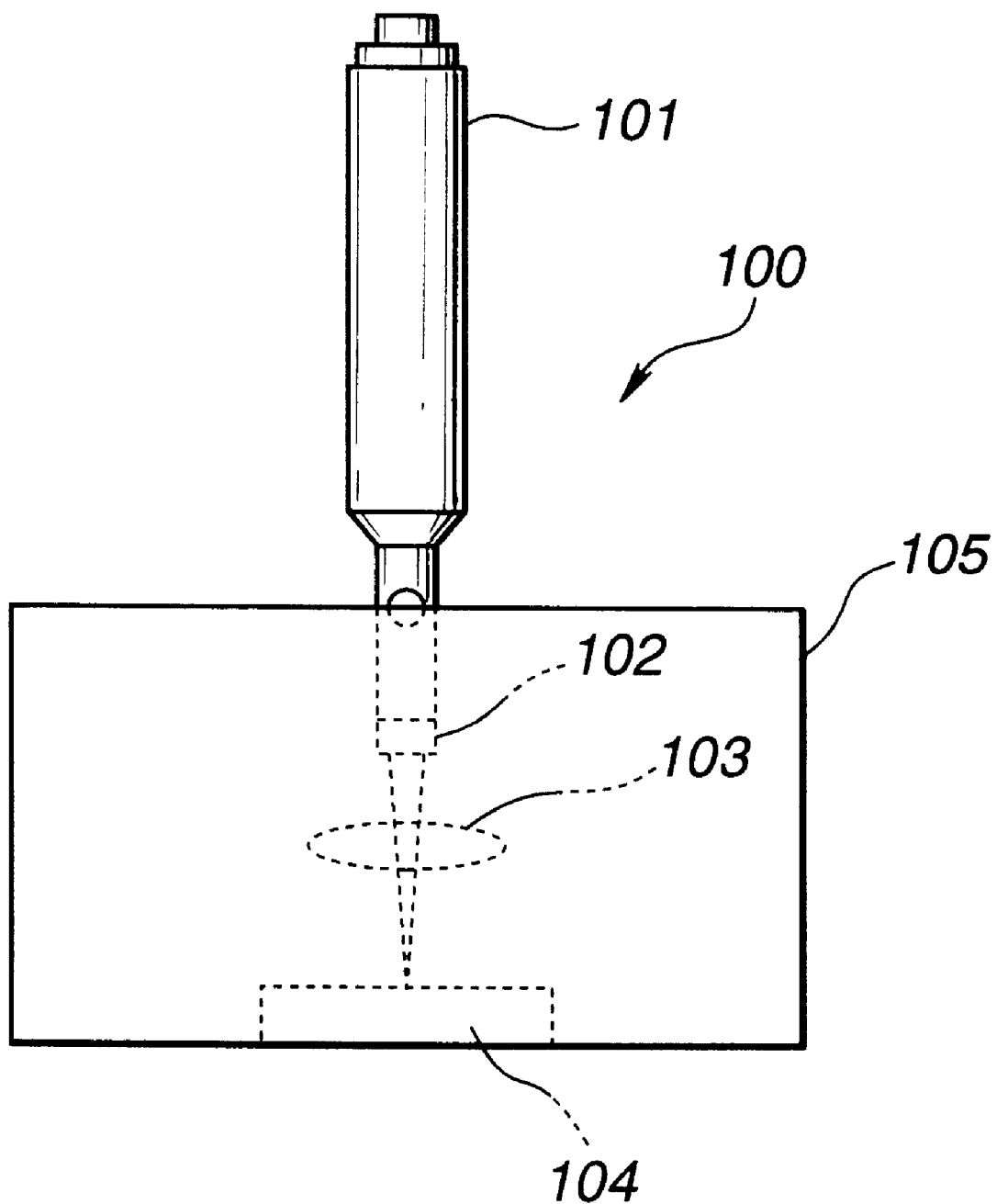
FIG. 3 is a schematic view showing an example of a conventional joystick.
Figure 4:
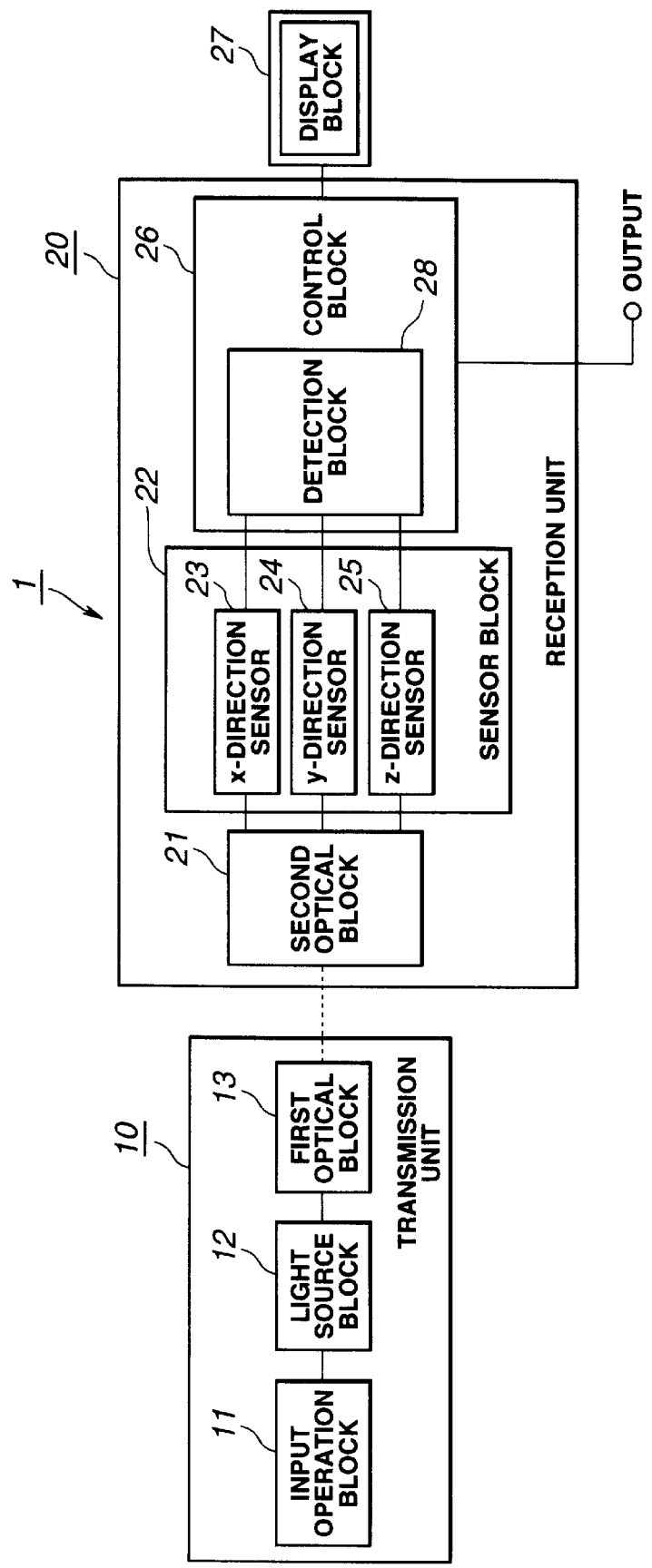
FIG. 4 is a block diagram showing a configuration of a remote control unit according to an embodiment of the present invention.

FIG. 4 is a block diagram showing the remote control apparatus according to the embodiment of the present invention including a transmission unit 10, a reception unit 20, and a display block 27. No electrical connection is provided between the transmission unit 10 and the reception unit 20 which are spatially separated from each other.

The transmission unit 10 of the remote control apparatus 1 has an input operation block 11, a light source block 12, and a first optical block 13, the input operation block 11 is provided with a pushbutton for entering an instruction which controls the light source block 12. For example, when the pushbutton is depressed, the light source block 12 emits a light. The first optical light source block 12 uses a light emitting diode or the like which is turned on and off by control through the input operation block, and the light emitted is introduced to the first optical block 133. The first optical block 13 receives the light emitted from the light source block 12 and converts the light into a beam.

The reception unit 20 has a second optical block 21, a sensor block 22, and a control block 26. The second optical block 21 receives the beam emitted from the transmission unit 10 and converges to sensors of the sensor block 22. The sensor block 22 consists of at least two sensors of an x-direction linear sensor 23 and a y-direction linear sensor 24 when detecting a position in two dimensions, or at least three sensors additionally having z-direction sensor 25 when detecting a position in three dimensions. Each of these linear sensors detects distribution of the beam intensity in the corresponding direction and supplies the result to the control block 26. The control block 26 has a detection block 28 which analyzes signals from the linear sensors so as to detect a position of the transmission unit 10. The position of the transmission unit 10 detected is supplied to the display block and, if necessary, a data is externally outputted.

The display block 27 has a display screen which displays a data supplied from the reception block.

Figure 5:
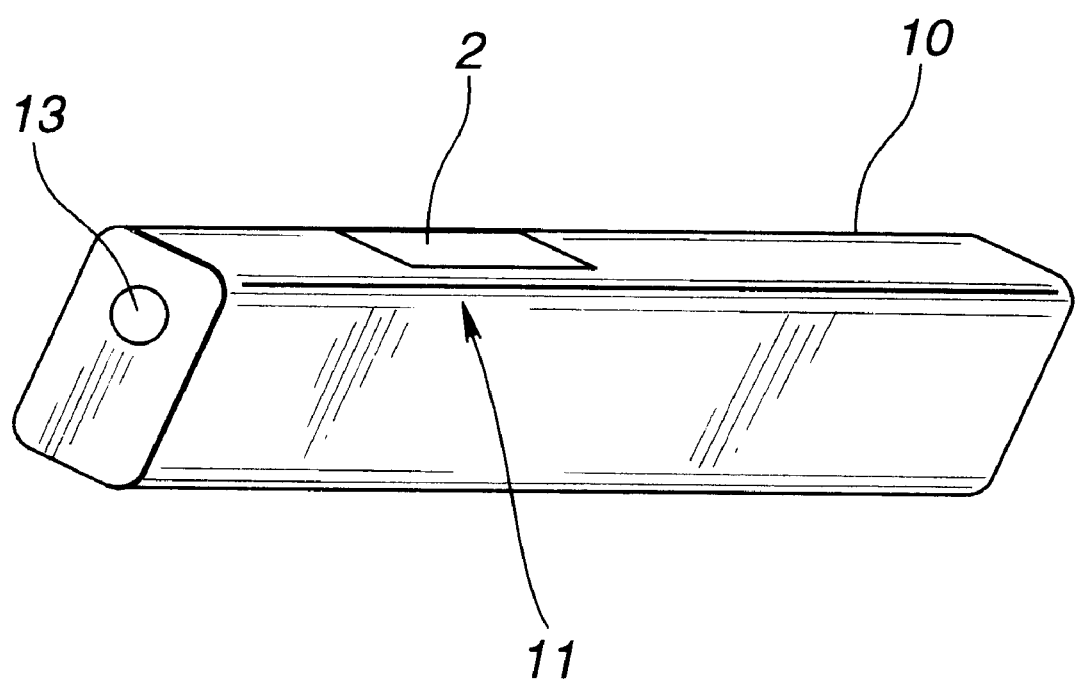
FIG. 5 is a perspective view showing a transmission unit according to an embodiment of the present invention.

As shown in FIG. 5, the transmission unit 10 has a casing of an approximately rectangular parallelepiped in which an optical axis of the beam emitted from the first optical block 3 is arranged in the longitudinal direction of the casing. The casing has a size convenient to be grasped by a hand for operation. A pushbutton 2 is provided as the input operation block 11 at a position in the front half so as to be easily operated by a finger when the casing is grasped by a hand. Normally, the transmission unit 10 has a power source such as a battery so as to be operated without an external power source.

The transmission unit 10 is controlled so that the light source block 12 emits a light when the transmission unit 10 is grasped or the pushbutton 2 is depressed. The light emitted from this light source block is converted into a beam by the first optical block 13.

Figure 6:
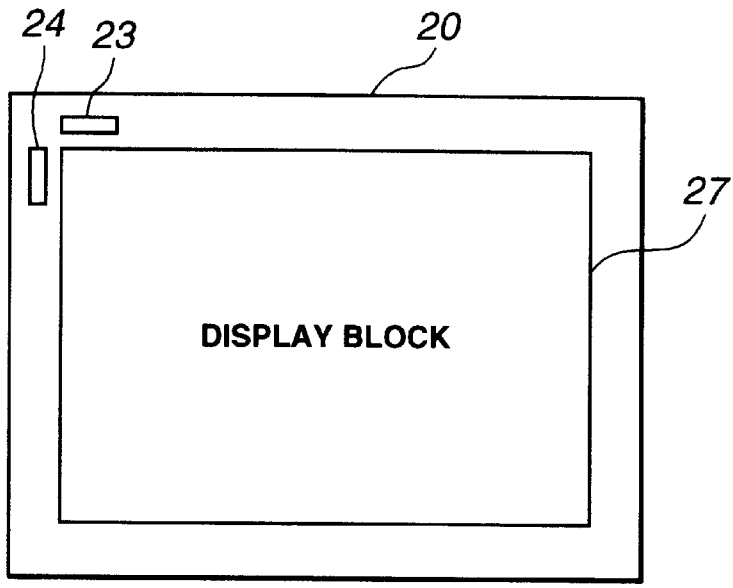
FIG. 6 schematically shows an arrangement of a linear sensor in a reception unit according to an embodiment.

FIG. 6 shows the reception unit 20 according to a first embodiment consisting of the x-direction linear sensor 23 and the y-direction linear sensor 24 located outside of the upper left of the display block 27 and each arranged in a casing of a flat rectangular parallelepiped. The x-direction sensor 23 is arranged so as to have the longitudinal direction in parallel to the top of the display block, whereas the y-direction sensor 24 is arranged so as to have the longitudinal direction in parallel to the side of the display block.

Figure 7:
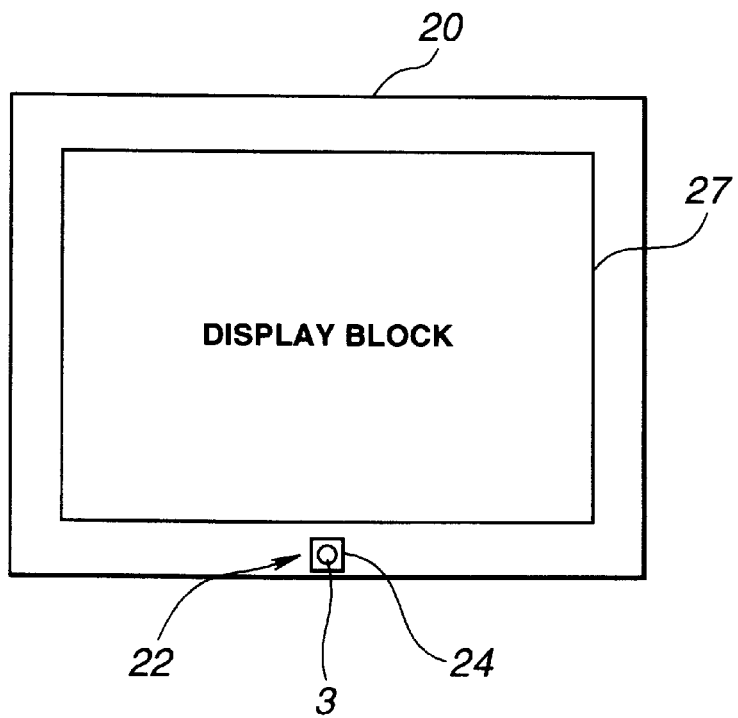
FIG. 7 is a schematic view showing a reception unit according to an embodiment.

FIG. 7 shows the reception unit according to a second embodiment. Instead of the x-direction linear sensor 23 and the y-direction linear sensor at the upper left of the display block 27 in the fist embodiment, the reception unit 20 according to the second embodiment consists of the aforementioned second optical block 21 having a lens 3 and located below the display block. The sensor block 22 having the aforementioned x-direction linear sensor 23 and the y-direction linear sensor 24 is arranged inside of this reception unit 20.

In the reception unit 20, the beam reaching from the transmission unit 10 is converged by the lens 3 of the second optical block 21 to the sensor block 22 having the aforementioned linear sensors. The sensor block 22 has at least two sensors of the x-direction linear sensor and the y-direction linear sensor. These sensors are arranged in respective directions so as to be able to effectively separate the x-direction component and the y-direction component of the beam. The directions of these sensors may form a right angle or an angle other than right angle.

Here, the direction of a linear sensor (one-dimensional light receiving element) represents the longitudinal direction of the linear sensor in which light receiving elements are arranged in one dimension.

Figure 8:
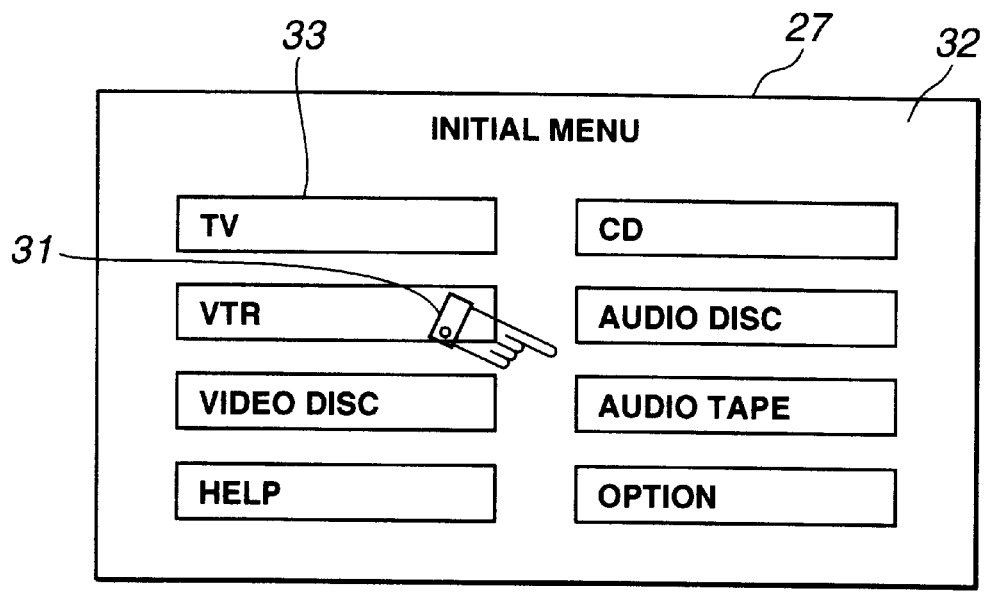
FIG. 8 is a plan view showing an "Initial Menu" on a display block.

FIG. 8 shows an example of an initial screen on the display screen of the display block 27. The reception unit 20 displays a menu having a layered configuration on the display screen of the display block 27. A function can be selected through this menu by operating the transmission unit 10.

That is, when the transmission unit 10 is grasped by a hand or the pushbutton 2 is depressed by a finger, the first optical block 13 emits a beam. This operation of the transmission unit 10 is carried out toward the reception unit 20. When the reception unit 20 detects the beam emitted from the transmission unit 10, the reception unit 20 displays an "Initial menu" 32 on the display screen.

This "Initial menu" 32 shows on the left half four select buttons of "TV", "VTR", "Video disc", and "Help" in this order from the top to the bottom. On the right half of the screen, four buttons of "CD", "Audio disc", "Audio tape", and "Option" are arranged in this order from the top to the bottom of the screen. When this "Initial menu" is opened, a cursor 31 is positioned at the center of the screen.

The display block 27 shows contents of the respective functions. When one of the select button is selected, a corresponding screen appears, through which a substantial operation can be carried out. That is, through "TV menu", "VTR menu", "Video disc menu", "Help menu", "CD menu", "Audio disc menu", "Audio tape menu", and "Option menu" appear when the corresponding button is selected, and through these screens further selection can be carried out by using the cursor 31.

Figure 9:
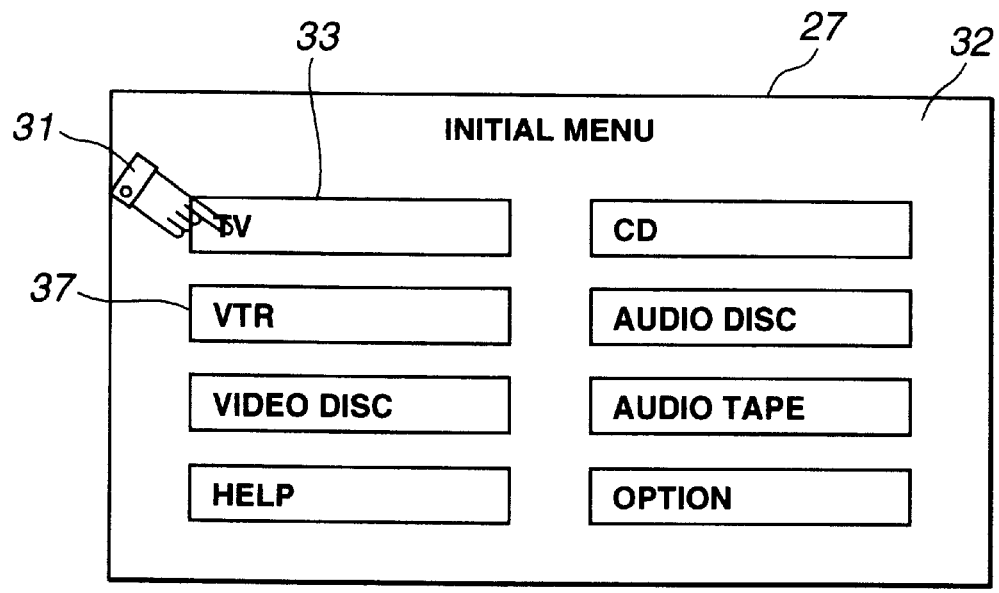
FIG. 9 is a plan view showing that a "TV" button is depressed on the Initial Menu screen.

FIG. 9 shows that the "TV" button 33 is selected by the cursor 31 on the Initial menu 32 of the display block 27. The cursor 31 can be moved from the center to the upper left of the display block 27 by directing the beam from the transmission unit 10 from the center to the upper left of the display block 27.

That is, the cursor 31 can be moved on the display screen of the display block 27 by changing the direction of the transmission unit 10 and the select button indicated by the cursor 31 can be specified by depressing the pushbutton 2 on the transmission unit 10.

If the pushbutton 2 of the transmission unit 10 is depressed while the cursor 31 indicates the "TV" button on the Initial screen, the "TV" button is selected and the "Initial menu" 32 is replaced by the "TV menu" on the display block 27.

The "TV menu" shows on the left half of the screen four buttons of "Channel", "!ch", "Previous page", and "Others" in this order from the top to the bottom of the screen, whereas the right half of the screen shows four buttons of "Volume", "4ch", "Initial menu", and "Help" in this order from the top to the bottom of the screen. When one of these select buttons is selected by using the cursor 31, a corresponding function can be carried out.

That is, the "Channel" button 35 changes the channel number; the "1ch" button selects the channel "1ch"; the "Previous page" button shows a "menu" immediately before; the "Others" button shows "Other menu"; the "Volume" button changes the sound volume; the "4ch" button changes the channel to channel "4ch"; the "Initial menu" button shows the "Initial menu"; and the "Help" button shows the contents of Help.

Figure 10:
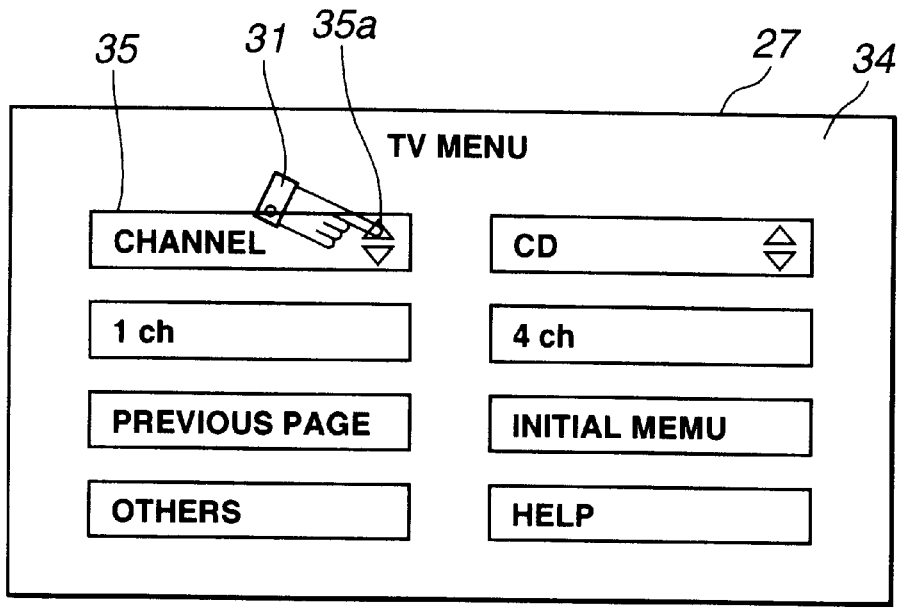
FIG. 10 is a plan view showing that a "Channel" button is depressed on a "TV menu" screen.

For example, as shown in FIG. 10, the "Channel" button 35 of the "TV menu" has an "up" button 35a and a "down" button 35b. When the cursor 31 is positioned at the "up" button 35a and the pushbutton 2 is depressed, the channel number of the television apparatus is incremented by one. Similarly, if the cursor is set to the "down" button 35b and the pushbutton 2 is depressed, the channel number is decremented by one. The "Others" button is used to display "Other" menu relating to this "TV menu" 34.

Figure 11:
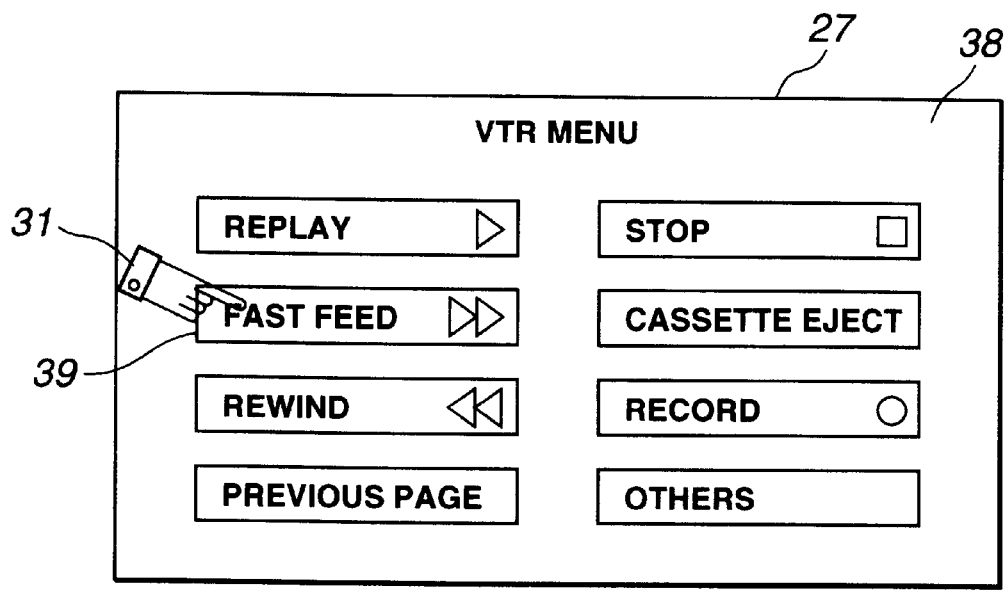
FIG. 11 is a plan view showing that a "Fast Feed" button is selected on a "VTR menu" screen.

FIG. 11 shows the "VTR menu" showing four pushbuttons of "Replay", "Fast feed", "Rewind", and "Previous page" in this order from the top to the bottom of the screen on the left half of the screen; and four buttons of "Stop", "Cassette eject", "Record", and "Others" in this order from the top to the bottom on the right half of the screen. These select buttons correspond to the respective functions and can be selected by setting the cursor 31 at a desired button and depressing the pushbutton 2 of the transmission unit 10.

For example, on this "VTR menu", if the cursor 31 is set to the "Fast feed" button 39 to select the function by pressing the pushbutton 2 of the transmission unit 10, fast feed is carried out in a video tape recorder connected to this reception unit.

Description will now be directed to the principle of position detection of the transmission unit 10 by the reception unit 20. Firstly, explanation will be given on detection of a one-dimensional position.

Figure 12:
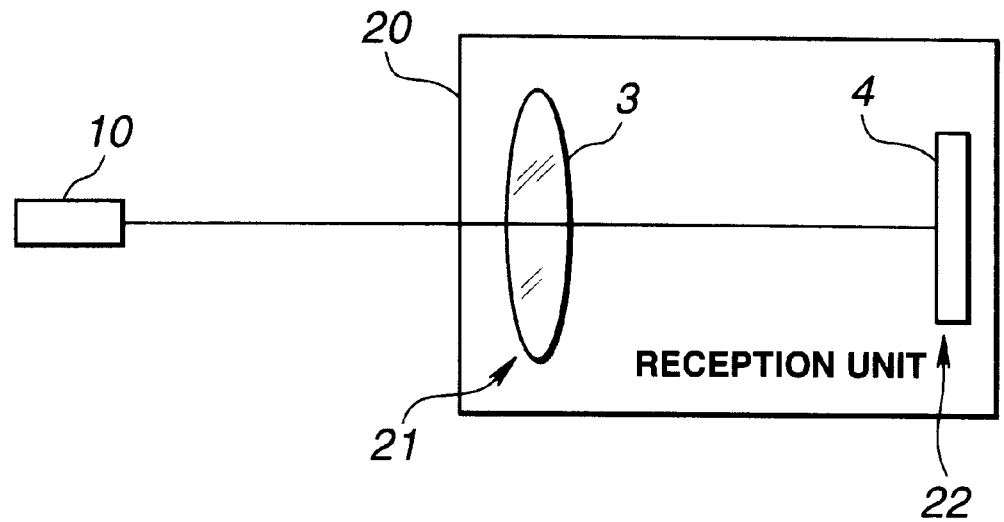
FIG. 12 is a side view showing that a reception unit detects a beam emitted from a transmission unit positioned on an optical axis of this reception unit.

As shown in FIG. 12, if a beam emitted from the transmission unit 10 found on an optical axis of the reception unit, the beam emitted from the transmission unit 10 is converged by the lens 3 of the second optical block 21 of the reception unit 20 to the center of the linear sensor 4 of the sensor block 22.

Figure 13:
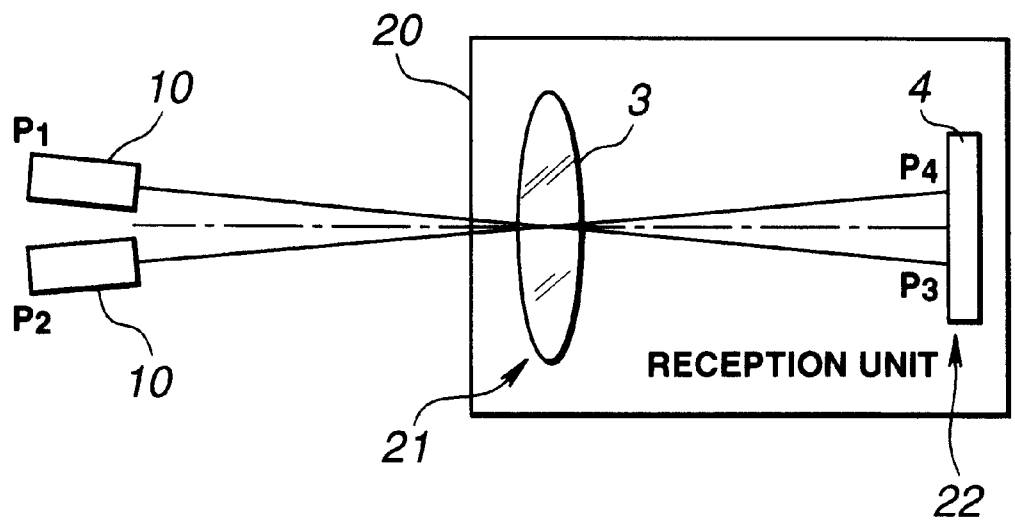
FIG. 13 is a side view showing that a reception unit detects a beam emitted from a transmission unit positioned out of an optical axis of this reception unit.

On the other hand, FIG. 13 shows a case when the transmission unit 10 is not found on the optical axis of the reception unit 20. If the transmission unit 10 is found at a position Pl, the beam emitted from this transmission unit 10 is converged by the lens 3 of the second optical block 21 of the reception unit 20 to a point P3 of the linear sensor 4 of the sensor block 22. If the transmission unit 10 is located at a position P2, the beam emitted from the transmission unit 10 is converted to a point P4 of the linear sensor 4.

Consequently, the position of the transmission unit 10 can be detected by checking the point where the beam is converged, i.e., the position having the maximum intensity of the beam.

Here, as the linear sensor 4, a CCD element is used. The CCD element is light receiving elements arranged in one dimension, each element generating an electric charge according to the intensity of light. The electric charge of each element is synchronized with a clock for output.

Figure 14:
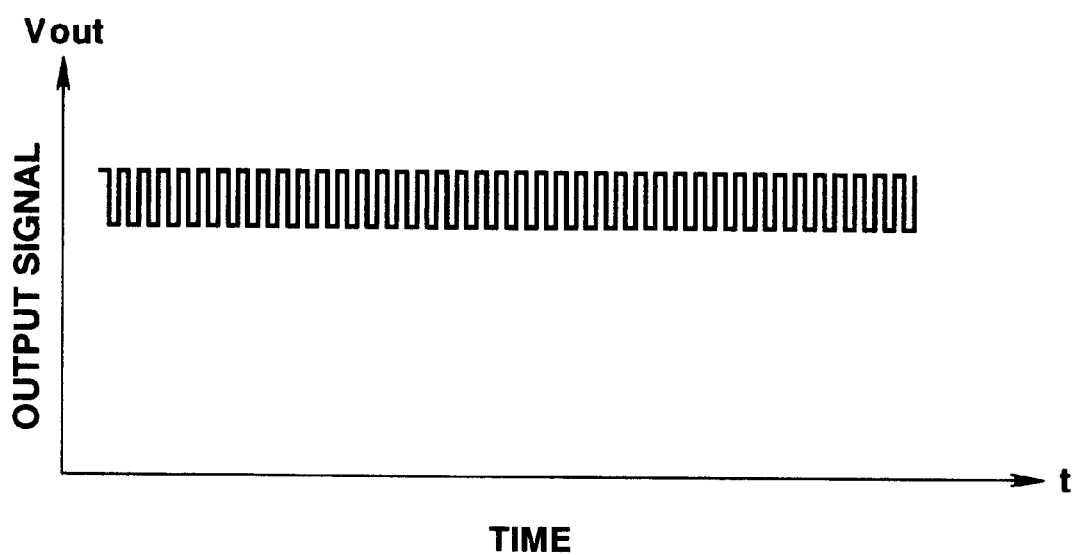
FIG. 14 is a time chart of an output signal from the linear sensor when no light is detected.

FIG. 14 is a time chart of an output signal when no light is coming to the linear sensor 4 using the CCD. The output signal is in a pulse form because an output from the CCD element is carried out according to a clock. Each cycle corresponds to one element. When no light is applied, the amplitude of the output signal is small and flat.

Figure 15:
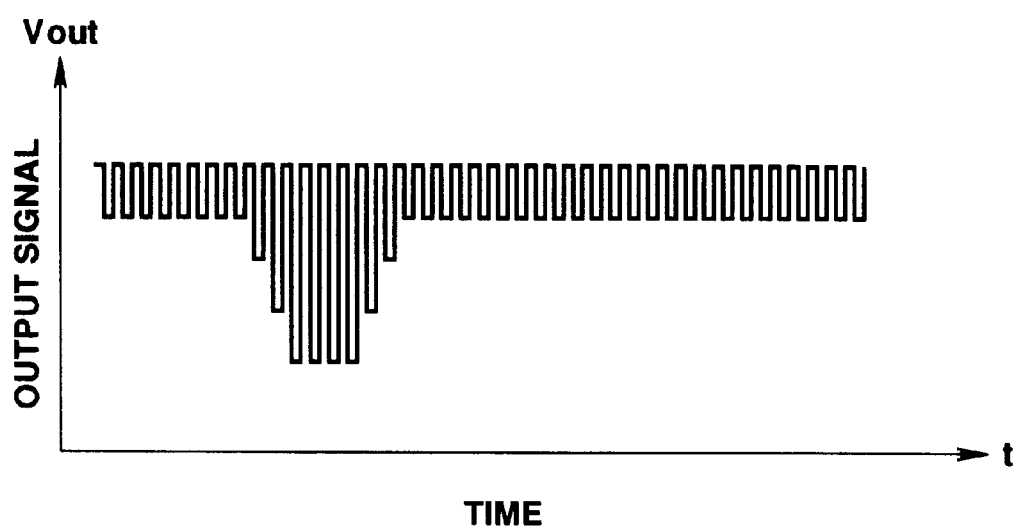
FIG. 15 is a time chart of an output signal from the linear sensor when a light is detected at a part of the linear sensor.

FIG. 15 is a time chart of an output signal from the linear sensor 4 when light is applied to a part of the linear sensor. The incident is detected and the amplitude of the output signal is partially increased in the negative direction. That is, the lower envelope of the output signal has the minimum value.

Figure 16:
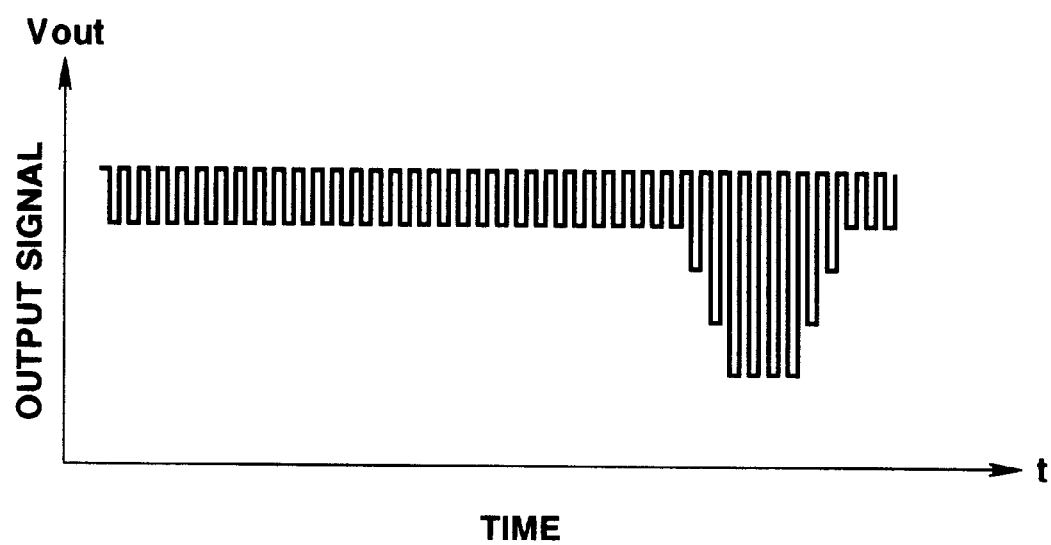
FIG. 16 is a time chart of an output signal from the linear sensor when a light is detected at another part of the linear sensor.

FIG. 16 is a time chart of an output signal from the linear sensor 4 when light comes to a place different from the case of FIG. 15. A similar change can be seen in the waveform of the output signal from the linear sensor, but the change of the waveform occurs at a different place.

Here, FIG. 14, FIG. 15, and FIG. 16 are time charts made by reading an output signal from the linear sensor 4 in the one-dimensional direction according to the clock. Consequently, the time axis in these charts corresponds to the one-dimensional direction which is the longitudinal direction of the linear sensor 4.

Description will now be directed to a case when the beam emitted from the transmission unit 10 is received by the reception unit so as to detect a position of the transmission unit 10 in two dimensions.

Figure 17:
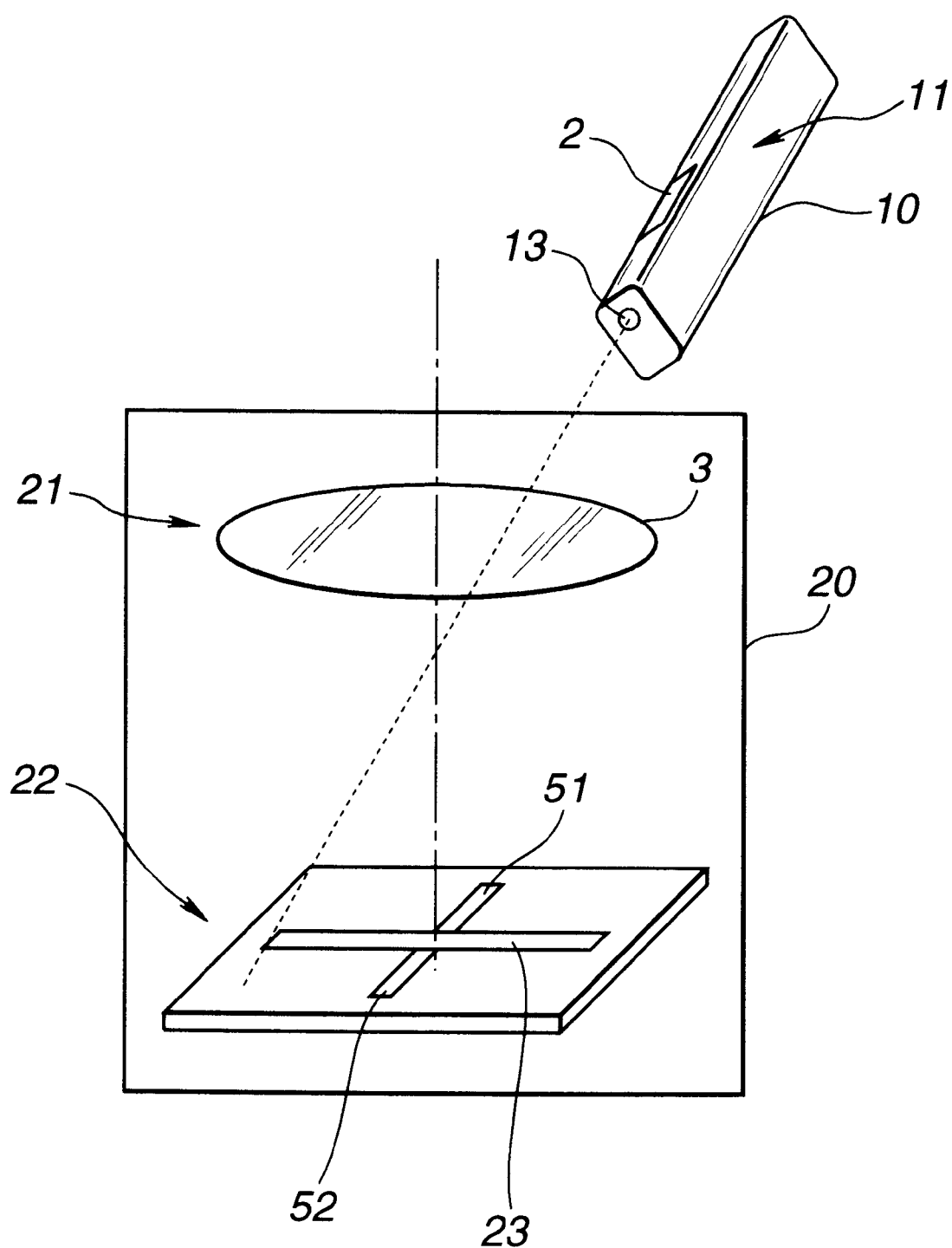
FIG. 17 is a schematic view showing that the reception unit detects in two dimensions a beam emitted from the transmission unit.

FIG. 17 shows a beam emitted from the transmission unit 10 and received by the reception unit 20. The beam is introduced via the second optical block 21 having the lens 3 and converted to the sensor block 22 having the x-direction linear sensor 23, a first y-direction linear sensor 51 and a second y-direction linear sensor 52.

The sensor block 22 has an approximately square plate having a main surface on which the linear sensors are arranged in a cross shape, each arranged in parallel or at a right or other angle to the side of the square plate of the sensor block. Here, the first y-direction linear sensor 51 and the second y-direction linear sensor 52 are arranged in a single line sandwiching the x-direction linear sensor 23.

In a case when the beam emitted from the transmission unit 10 is not found in any of the plane defined by the optical axis of the reception unit 20 and the x-direction linear sensor 23 and the plane defined by the optical axis and the y-direction linear sensors, the beam is converged out of the linear sensors on the main surface of the sensor block. Output signals from the respective linear sensors in such a case are shown below. Note that the beam need not be focused on the sensors of the sensor block 22.

Figure 18:
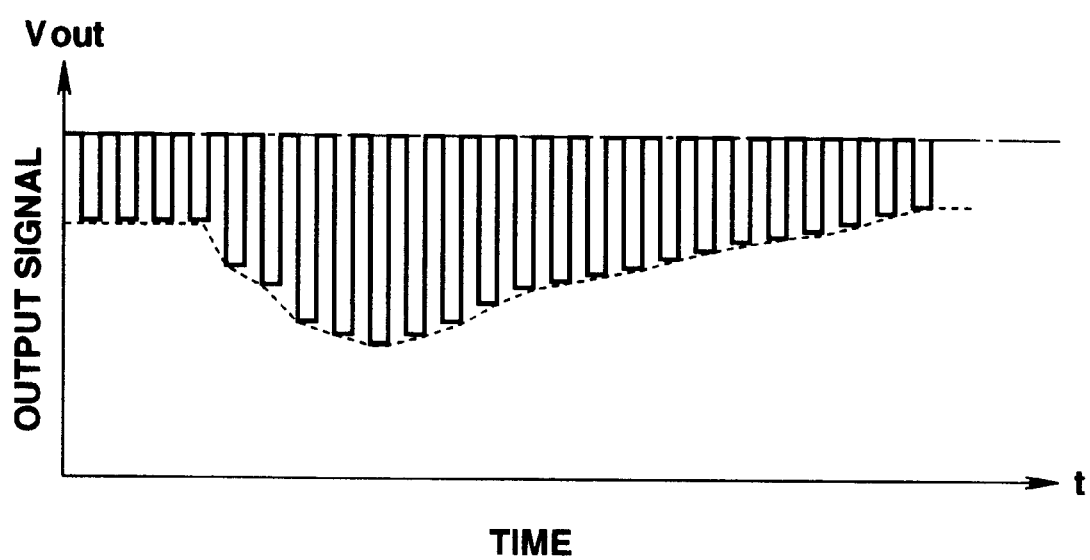
FIG. 18 is a time chart showing an output signal from the linear sensor in a x direction.

FIG. 18 shows an output signal from the x-direction linear sensor 23. According to the incident light intensity, the amplitude is increased at a part of the linear sensor. Note that the output signal has a reference level 0 indicated by a dotted line in the figure and the amplitude changes in the negative side (below in the figure). The same applies to the other output signals.

Figure 19:
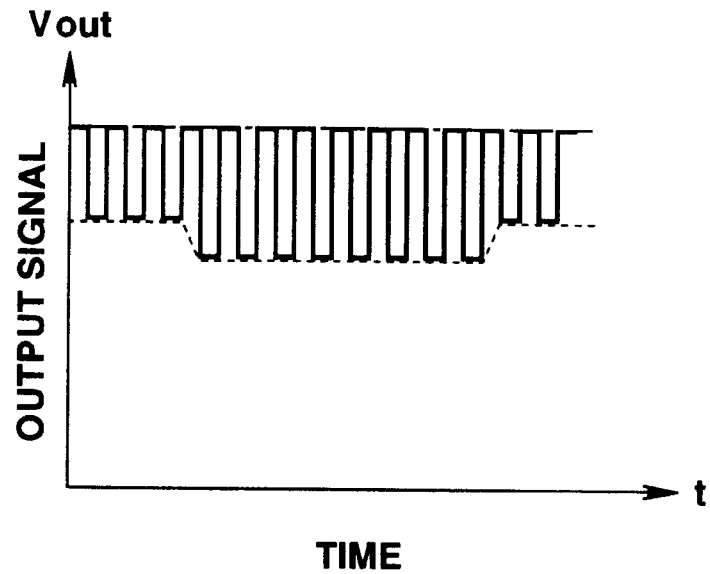
FIG. 19 is a time chart showing an output signal from the linear sensor in a first y direction.

FIG. 19 shows an output signal from the first y-direction linear sensor 51. The output amplitude is slightly increased at a part of this linear sensor. This means that a light is coming to this first y-direction linear sensor 51 but has a low intensity.

Figure 20:
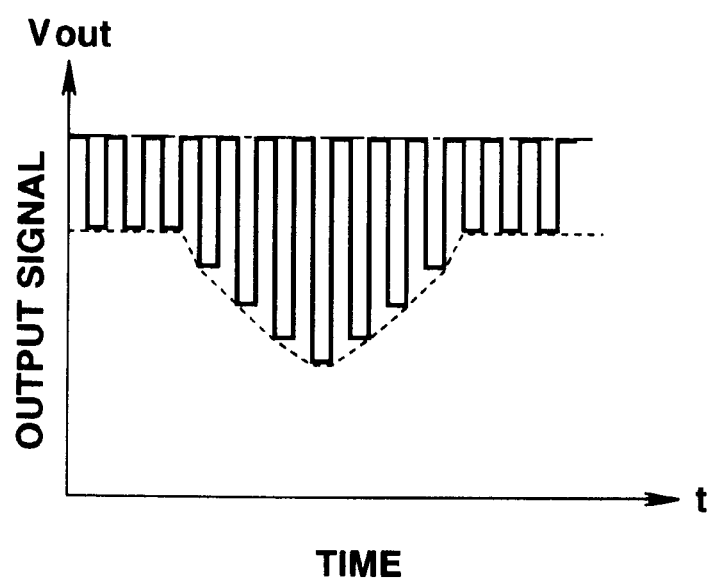
FIG. 20 is a time chart showing an output signal from the linear sensor in a second y direction.

FIG. 20 shows an output signal from the second y-direction linear sensor 52. The amplitude is increased at a part of this second y-direction linear sensor 52. This means that the light intensity is increased at this portion of this linear sensor.

It should be noted that in the above time charts, the horizontal axis, i.e., the time axis corresponds to the length of the linear sensor in the one-dimensional direction because the linear sensor outputs the output from the reception elements arranged in one dimension, according to the clock. That is, each of the first y-direction linear sensor and the second y-direction linear sensor has a length equal to half of the s-direction linear sensor and accordingly, the time axis in FIG. 19 and FIG. 20 is approximately half of the time axis of FIG. 18.

In the reception unit 20, the focusing position of the incident light on the sensor block 22 can be obtained from the output signal from linear sensor 4. That is, in the sensor block 22, it is possible to obtain a point where the output signal amplitude is maximum for each of the x-direction component and the y-axis direction component.

It should be noted that for detection of a two-dimensional position, it is possible to use a two-dimensional sensor instead of using a plurality of linear sensors as in the above case.

Figure 21:
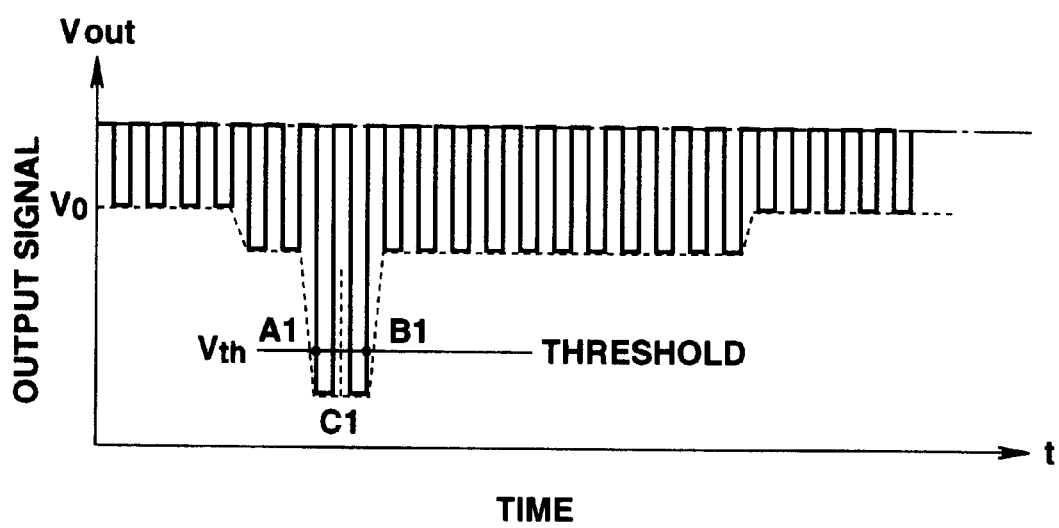
FIG. 21 is a time chart showing a relationship between a threshold potential and an example of an output signal from the linear sensor which has detected a light.

Here, explanation will be given on one of the methods to obtain a point where the output signal amplitude is maximum. As shown in FIG. 21, a threshold potential $V_{th}$ is defined lower by a predetermined voltage than the bottom $V_0$ of the output signal when no light is applied. If it is assumed that A1 is the point where the output signal exceeds this threshold potential in the negative direction and B1 is the point where the output signal returns within the threshold potential, then the point where the amplitude of the output signal becomes maximum is defined approximately to be the middle point C1 between the point A1 and the point B1.

Figure 22:
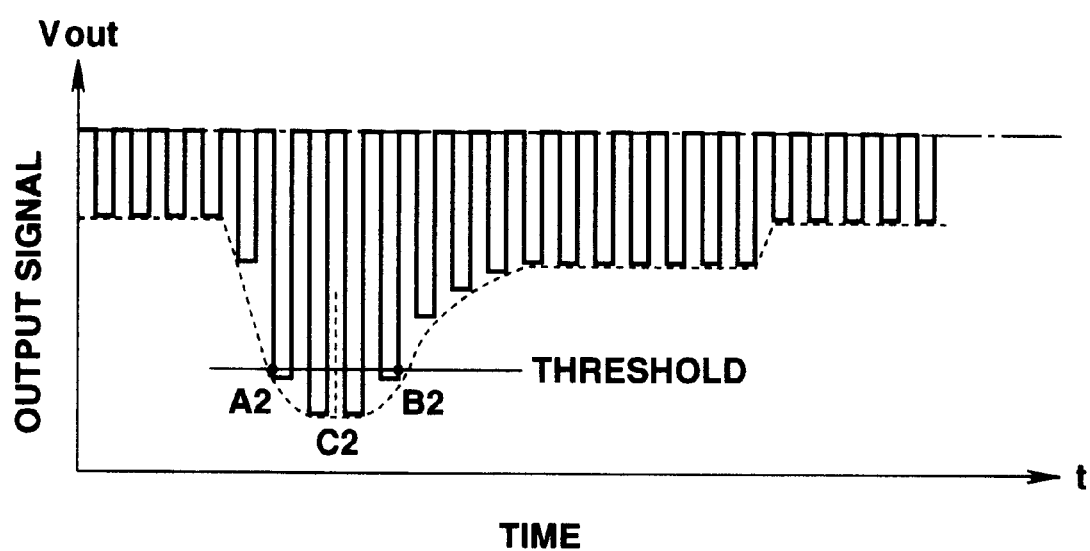
FIG. 22 is a time chart showing a relationship between the threshold potential and another example of an output signal from the linear sensor which has detected a light.

In FIG. 22, the amplitude of the output signal changes less abruptly around the maximum amplitude than the output signal of FIG. 21. In this case also, in the same way as in FIG. 21, the point where the output signal has the maximum amplitude can be defined as the middle point C2 of points A2 and B2, assuming that A2 is the point where the output signal exceeds the threshold potential in the negative direction and B2 is the point where the output signal returns within the threshold potential.

Thus, it is possible to obtain the middle point between the point where the bottom of the output signal exceeds a threshold potential in the negative direction and the point where the output signal returns within the threshold potential, so as to define the point where the amplitude of the output signal from the linear sensor 4, i.e., the point where the intensity of the incident light becomes maximum.

It should be noted that the difference between FIG. 21 and FIG. 22, i.e., whether the amplitude of the output signal changes gradually or abruptly around the maximum amplitude depends on some factors including whether the incident light is focused on the sensor block 22 or apart from the sensor block 22.

Figure 23:
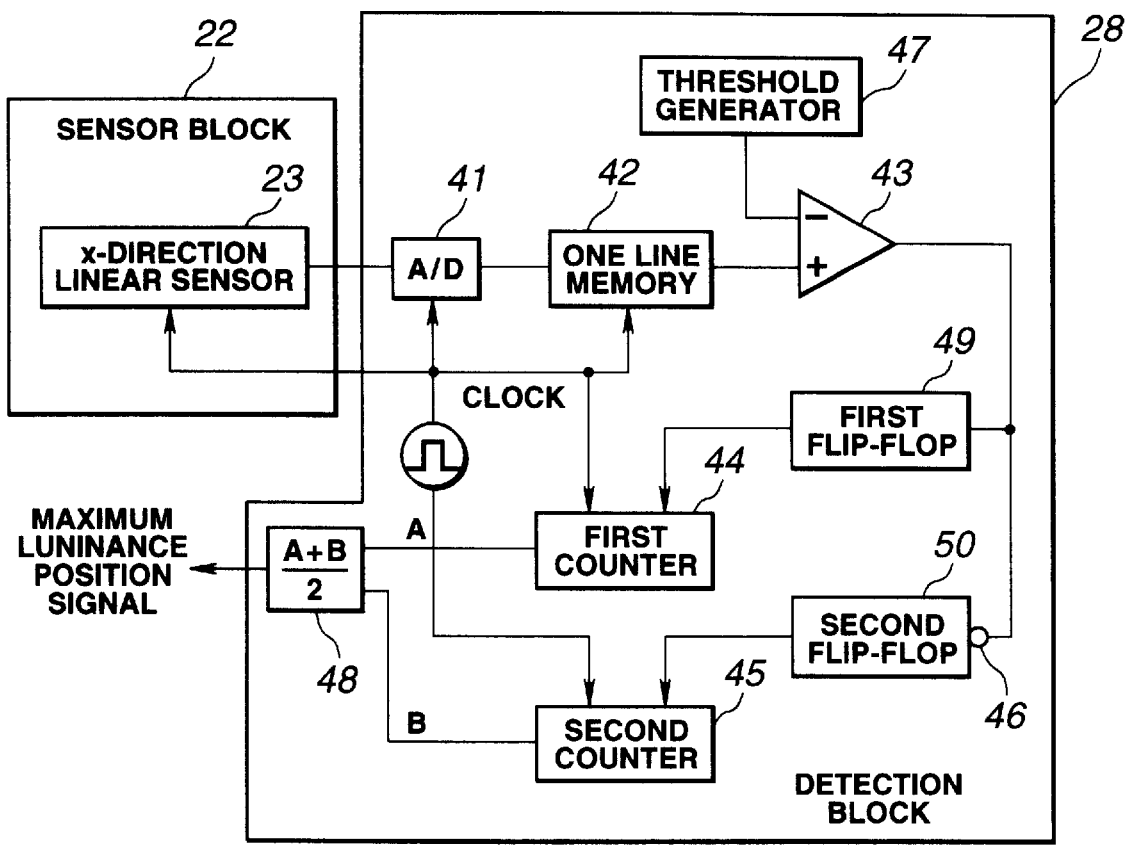
FIG. 23 is a block diagram showing a configuration example of circuit of a detection block of digital type.

FIG. 23 shows an example of configuration of a circuit for detecting the maximum amplitude of the aforementioned output signal. This circuit is a detection circuit of digital type which converts an output signal into a digital signal to be processed.

As shown in FIG. 23, the digital type detection circuit includes: an A/D converter 41; one line memory 42; an OP amplifier 43; a threshold generator 47; a first counter 44; a second counter 45; an inverter 46; a first flip-flop 49; a second flip-flop 50; and an average calculator 48.

An output signal which has been outputted from the x-direction linear sensor 23 of the sensor block 22 is supplied to the detection circuit 20, where the signal is digitized by the A/D converter and accumulated in the one line memory 42, from which the signal is read out according to a clock.

The signal from this one line memory 42 is supplied to the OP amplifier 43, where the signal is compared to a threshold potential generated by the threshold generator 43, and the comparison result is supplied to the first flip-flop 49 and via the inverter 46 to the second flip-flop 50.

The first flip-flop 49 supplies the output to the first counter 44 at the timing of the point A (point A1 in FIG. 21 and point A2 in FIG. 22). The first counter 44 counts a clock count A from the start of the one line up to the tail timing fed from the first flip-flop 49 and supplies the clock count A to the average calculator 48. The second flip-flop 45 supplies the second counter 45 with the timing of the point B (point B1 in FIG. 21 and point B2 in FIG. 22).

Moreover, the second counter 45 supplies the average calculator 48 with the clock count from the start of the one line up to the point B supplied from the second flip-flop 46.

The average calculator 48 calculates an average of the clock count A up to the point A and the clock count B up to the point B and outputs the average. This average corresponds to the middle point between the point A and the point B, i.e., the point where the output signal has the maximum amplitude.

Description will now be directed to a detection circuit for detecting the maximum amplitude of the output signal which remains as an analog signal.

Figure 24:
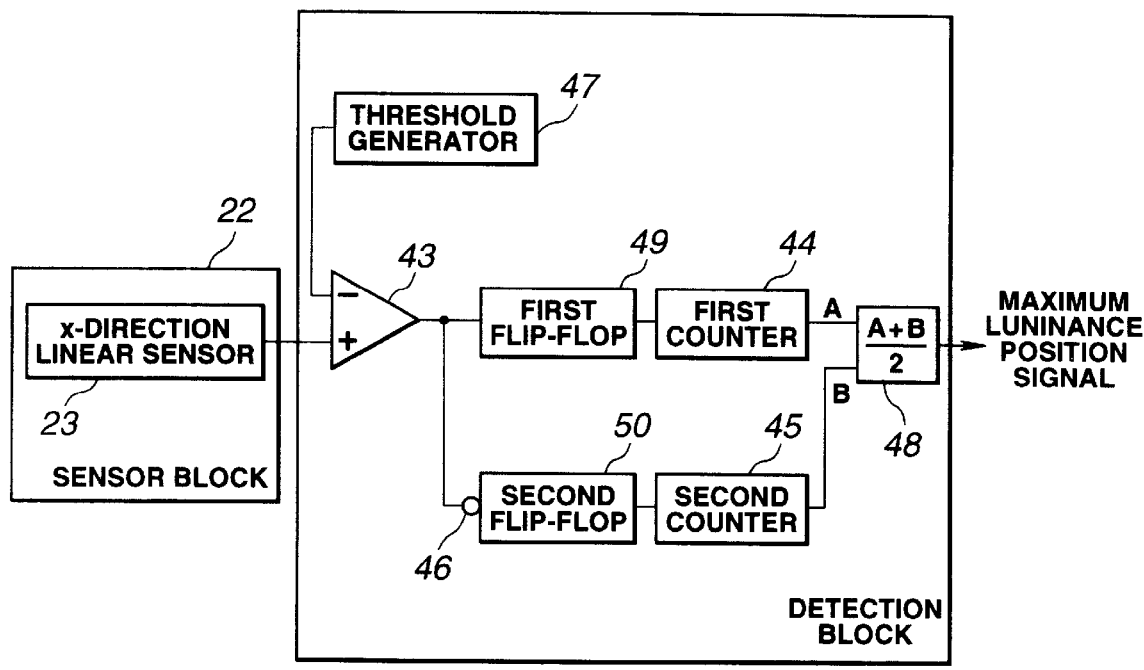
FIG. 24 is a block diagram showing a configuration example of circuit of a detection block of analog type.

FIG. 24 shows configuration of this analog type detection including: an OP amplifier 43; a threshold generator 47; an inverter 46; a first flip-flop 49; a second flip-flop 50; a first counter 44; a second counter 45; and an average calculator 48.

The output signal supplied from the x-direction linear sensor of the sensor block 22 is supplied to the OP amplifier 43, where the signal is compared to a threshold potential supplied from the threshold generator 47, and the result is supplied to the first flip-flop 49 and via the inverter 46 to the second flip-flop 46.

The first counter 44 is reset at timing when the output signal is read out from the sensor block, and counts the clock until the first flip-flop reaches the point A (the point A1 in FIG. 21 and the point A2 in FIG. 22). The count result is supplied to the average calculator 48. The second counter 45, in the same way as the first counter 44, counts the clock from the start of reading out from the sensor block until the second flip-flop reaches the point B (the point B1 in FIG. 21 and the point B2 in FIG. 22), and outputs the count result B to the average calculator 48.

The average calculator 48 calculates an average of the count A counted by the first counter 44 and the count B counted by the second counter 45. The average obtained is the middle point between the point A and the point B, which corresponds to the point where the output signal has the maximum amplitude.

Description will now be directed to the sensor block 22 and the second optical block 21 when detecting a three-dimensional position of the transmission unit 10.

The sensor block 22 is provided with three linear sensors: an x-direction linear sensor 23; a y-direction linear sensor 24, and a z-direction linear sensor. Corresponding to the three types of linear sensors, the second optical block 21 has a first lens 5, a second lens 6, and a third lens 7. However, there is also a case when the second optical block 21 has two lenses.

Explanation will be given on the sensor block 22 and the second optical block 21 corresponding this sensor block 22 for detecting a three-dimensional position of the transmission unit 10 according to a first embodiment.

Figure 25:
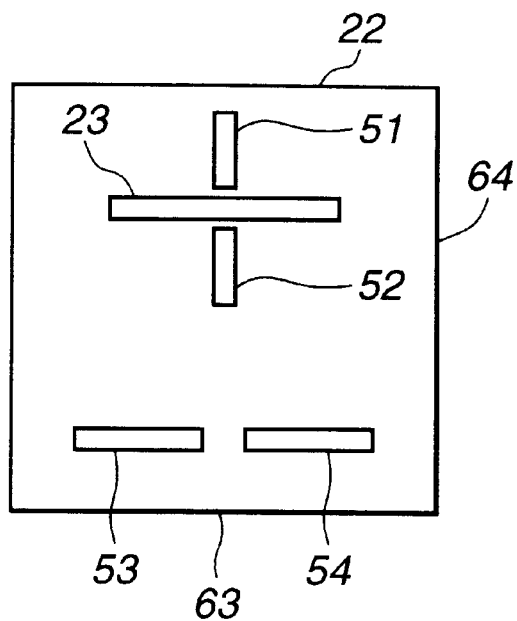
FIG. 25 is a plan view showing a sensor block of the reception unit for detecting a position of the transmission unit in three dimensions according to a first embodiment.

As shown in FIG. 25, the sensor block 22 is provided on its main surface with the x-direction linear sensor 23, the first y-direction linear sensor 51, the second y-direction linear sensor 52, the first z-direction linear sensor 53, and the second z-direction linear sensor 54.

The first y-direction linear sensor 51 and the second y-direction linear sensor 52 are arranged so as to sandwich the center of the x-direction linear sensor at a right angle or other angle. The first y-direction sensor 51 is arranged above and second y-direction sensor 52 is arranged below the x-direction linear sensor in the figure.

The first z-direction linear sensor 53 and the second z-direction linear sensor 54 are arranged in one line with a interval in parallel or approximately parallel to the x-direction linear sensor. In the figure, the first z-direction linear sensor 53 is arranged at the lower left and the second z-direction sensor 54 is arranged at the lower right.

Figure 26:
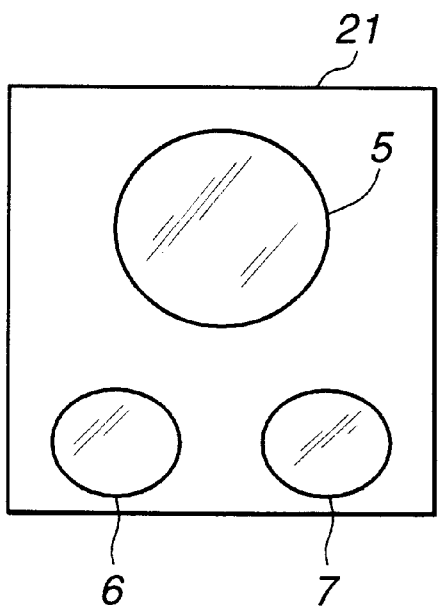
FIG. 26 is a plan view of a second optical block of the reception unit for detecting a position of the transmission unit in three dimensions according to a first embodiment.

As shown in FIG. 26, the second optical block 21 has a first lens 5, a second lens 6, a third lens 7, and a support member for supporting these lenses.

The first lens 5 corresponds to the x-direction linear sensor 23, the first y-direction linear sensor 51, and the second y-direction linear sensor 52 of the sensor block 22. This first lens 5 is arranged so as to have an optical axis passing through the center or almost center of the x-direction linear sensor and the middle point or almost the middle point between the first y-direction linear sensor 51 and the second y-direction linear sensor 52.

The second lens 6 corresponds to the first z-direction linear sensor 53. This second lens 6 is arranged so as to have an optical axis passing through the center or almost the center of the first z-direction linear sensor.

The third lens 7 corresponds to the second z-direction linear sensor 54. This third lens 7 is arranged so as to have an optical axis passing through the center or almost center of the second z-direction linear sensor.

Description will now be directed to the sensor block 22 and the second optical block 21 corresponding to this sensor block 22 for detecting a three-dimensional position of the transmission unit 10 according to a second embodiment.

Figure 27:
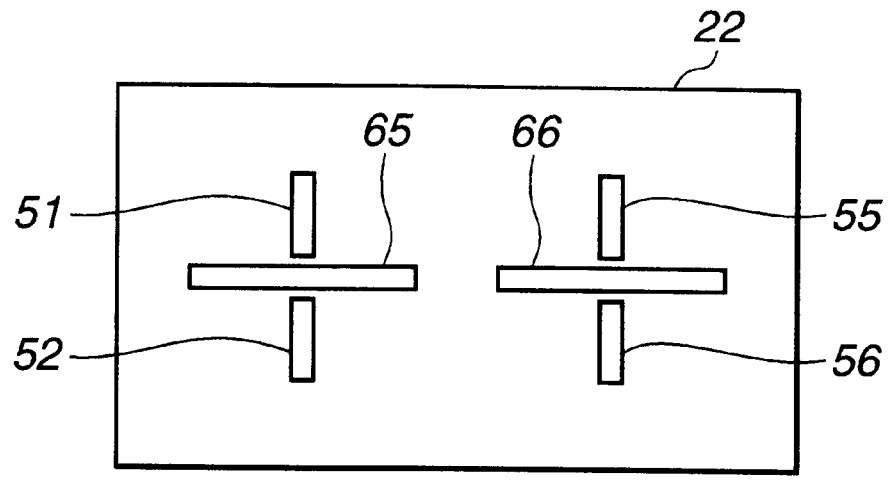
FIG. 27 is a plan view showing a sensor block of the reception unit for detecting a position of the transmission unit in three dimensions according to a second embodiment.

As shown in FIG. 27, the sensor block 22 has on its main surface a first x-direction and z-direction linear sensor 65, a second x-direction and z-direction linear sensor 66, a first y-direction linear sensor 51, a second y-direction linear sensor 52, a third y-direction linear sensor 55, and a fourth y-direction linear sensor 56.

The first x-direction and z-direction linear sensor 65 and the second x-direction and z-direction linear sensor 66 are arranged in one line with an interval. The first x-direction and z-direction linear sensor 65 is arranged at the center left and the second x-direction and z-direction linear sensor 66 is arranged at the center right in the figure.

The first y-direction linear sensor 51 and the second y-direction linear sensor 52 are arranged in the upper half and in the lower half of the figure, respectively, so as to sandwich the center or almost center of the first x-direction and z-direction linear sensor 65 at a right angle or other angle.

The third y-direction linear sensor 55 and the fourth y-direction linear sensor 56 are arranged in the upper half and in the lower half of the figure, respectively, so as to sandwich the center or almost center of the second x-direction and z-direction linear sensor 66 at a right angle or other angle.

Figure 28:
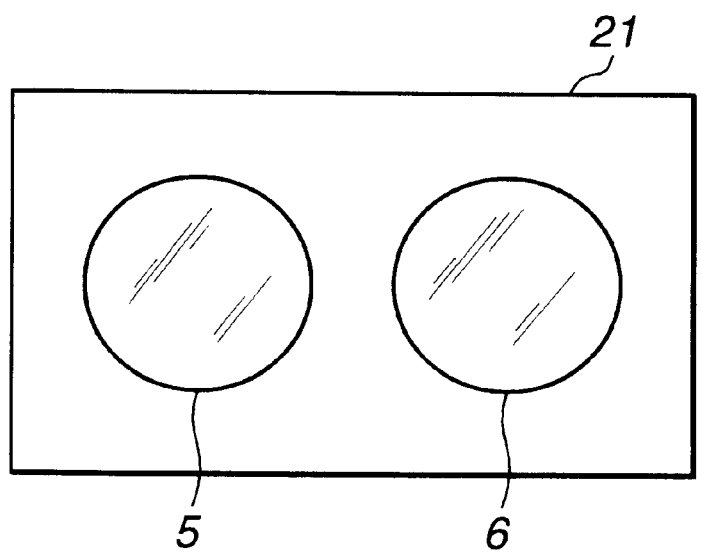
FIG. 28 is a plan view of a second optical block of the reception unit for detecting a position of the transmission unit in three dimensions according to a second embodiment.

As shown in FIG. 28, the second optical block includes a first lens 5, a second lens 6, and a support member for supporting these lenses.

The first lens 5 corresponds to the first x-direction and z-direction linear sensor 65, the first y-direction linear sensor 51, and the second y-direction linear sensor 52 of the sensor block 22. This first lens 5 is arranged so as to have an optical axis passing through the center or almost center of the first x-direction and z-direction linear sensor 65 and the middle point or almost middle point between the first y-direction linear sensor 51 and the second y-direction linear sensor 52.

The second lens 6 corresponds to the second x-direction and z-direction linear sensor 66, the third y-direction linear sensor 55, and the fourth y-direction linear sensor 56 of the sensor block 22. This second lens 6 is arranged so as to have an optical axis passing through the center or almost center of the second x-direction and z-direction linear sensor 66 and the middle point or almost middle point between the third y-direction linear sensor 55 and the fourth y-direction linear sensor 56.

Description will now be directed to the sensor block 22 and the second optical block 21 corresponding to this sensor block for detecting a three-dimensional position of the transmission unit 10 according to a third embodiment.

Figure 29:
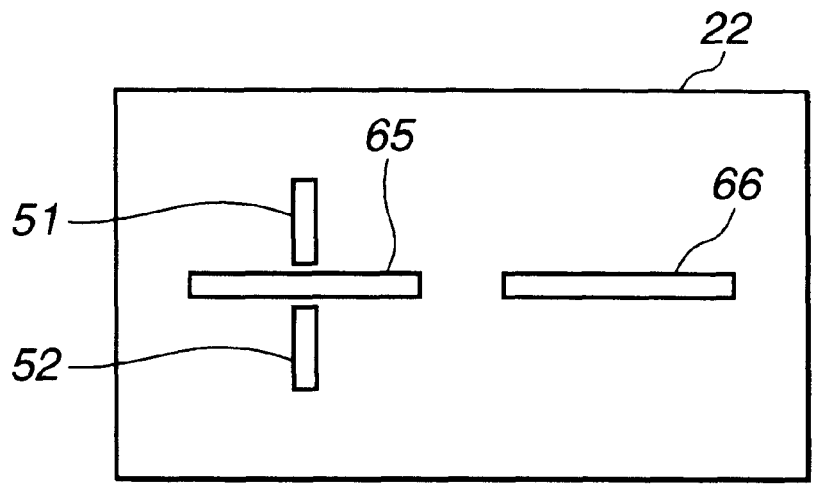
FIG. 29 is a plan view showing a sensor block of the reception unit for detecting a position of the transmission unit in three dimensions according to a third embodiment.

As shown in FIG. 29, the sensor block 22 has on its main surface a first x-direction and z-direction linear sensor 65, a second x-direction and z-direction linear sensor 66, a first y direction linear sensor 51, and a second y-direction linear sensor 52.

In the figure, the first x-direction and z-direction linear sensor 65 is arranged in the left half and the second x-direction and z-direction linear sensor 66 is arranged in the right half, so that the first x-direction and z-direction linear sensor 65 and the second x-direction and z-direction linear sensor 66 are in one line at an interval.

The first y-direction linear sensor is arranged in the upper half and the second y-direction linear sensor is arranged in the lower half so as to sandwich the center or almost center of the first x-direction and z-direction linear sensor 65 at a right angle or other angle.

Figure 30:
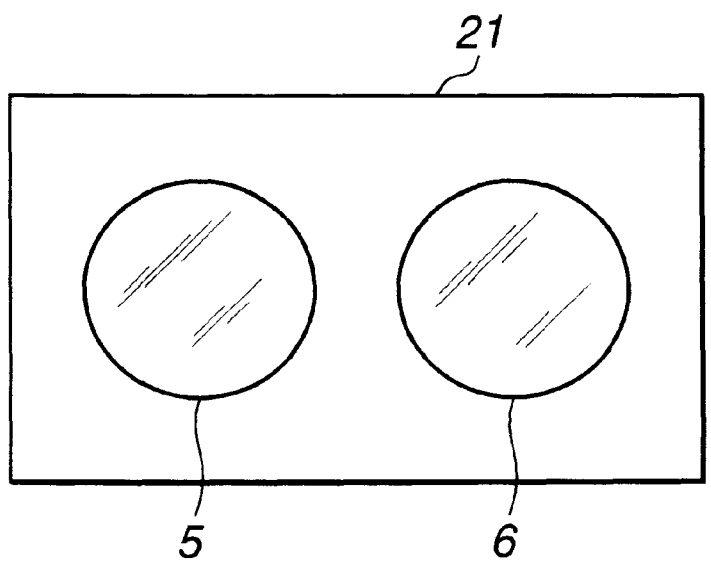
FIG. 30 is a plan view of a second optical block of the reception unit for detecting a position of the transmission unit in three dimensions according to a third embodiment.

As shown in FIG. 30, the second optical block 21 has a first lens 5, a second lens 6, and a support member for supporting these lenses.

The first lens 5 corresponds to the first x-direction and z-direction linear sensor 65, the first y-direction linear sensor 51, and the second y-direction linear sensor 52 of the sensor block 22. This first lens 5 is arranged so as to have an optical axis passing through the center or almost center of the first x-direction and z-direction linear sensor 65 and the middle point or almost middle point between the first y-direction linear sensor 51 and the second y-direction linear sensor 52.

The second lens 6 correspond to the second x-direction and z-direction linear sensor 66 of the sensor block 22. This second lens 6 is arranged so as to have an optical axis passing through the center or almost center of the second x-direction and z-direction linear sensor 66.

Description will now be directed to the sensor block 22 and the second optical block 21 corresponding to this sensor block 22 for detecting a position of the transmission unit 10 in three dimensions according to a fourth embodiment.

Figure 31:
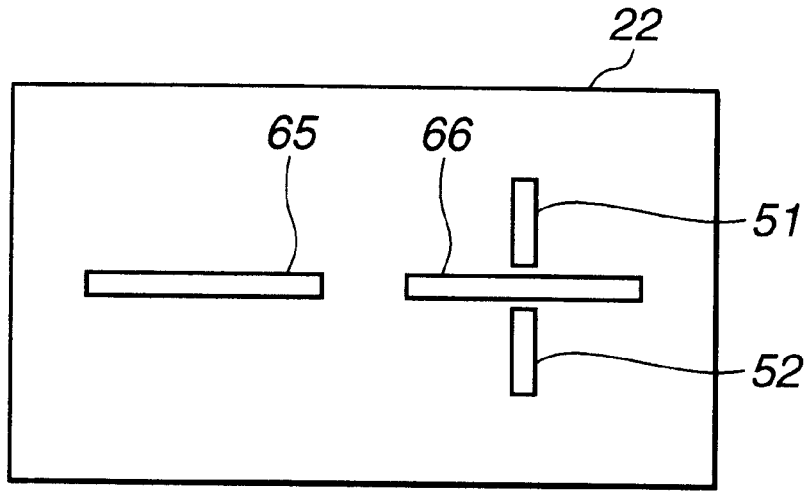
FIG. 31 is a plan view showing a sensor block of the reception unit for detecting a position of the transmission unit in three dimensions according to a fourth embodiment.

As shown in FIG. 31, the sensor block 22 has on its main surface a first x-direction and z-direction linear sensor 65, a second x-direction and z-direction linear sensor 66, a first y-direction linear sensor 51, and a second y-direction linear sensor 52.

In the figure, the first x-direction and z-direction linear sensor is arranged in the left half and the second x-direction and z-direction linear sensor is arranged in the right half so as to be in one line at an interval.

The first y-direction linear sensor is arranged in the upper half and the second y-direction linear sensor is arranged in the lower half of the figure, so as to sandwich the center or almost center of the second x-direction and z-direction linear sensor 66 so, forming a right angle or other angle.

Figure 32:
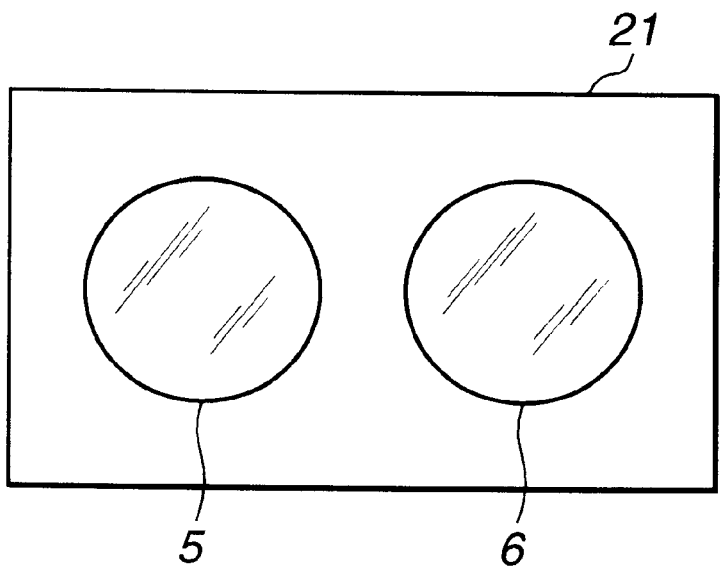
FIG. 32 is a plan view of a second optical block of the reception unit for detecting a position of the transmission unit in three dimensions according to a fourth embodiment.

As shown in FIG. 32, the second optical block includes a first lens 5, a second lens 6, and a support member for supporting these lenses.

The first lens 5 corresponds to the first x-direction and z-direction linear sensor 65 of the sensor block 22. This first lens 5 is arranged so as to have an optical axis passing through the center or almost center of the x-direction and z-direction linear sensor 65.

The second lens corresponds to the second x-direction and z-direction linear sensor 66, the first y-direction linear sensor 51, and the second y-direction linear sensor 52 of the sensor block 22. This second lens is arranged so as to have an optical axis passing through the center or almost center of the second x-axis and z-axis linear sensor 66 and the middle point or almost middle point between the first y-direction linear sensor 51 and the second y-direction linear sensor 52.

The position detection apparatus according to the present invention employs at least two one-dimensional light receiving elements for detection of a two-dimensional position of a light source, enabling to reduce the size and weight as well as the production costs of the apparatus in comparison to the case employing a single two-dimensional element.

Moreover, in the aforementioned position detection apparatus, the one-dimensional light receiving elements are arranged so as to intersect each other at a right angle or in a cross shape, thus enabling to effectively separate and receive an incident light.

Furthermore, in the aforementioned position detection apparatus when detecting a three-dimensional position, three or more one-dimensional light receiving elements are employed in which at least two elements are arranged in different directions, which enables to reduce the size and weight in the same way when detection a two-dimensional position. The productions costs are reduced as well.

The aforementioned one-dimensional light receiving elements used in the aforementioned position detection apparatus are CCD image pickup elements or BBD image pickup elements or MOS image pickup elements. Since these elements are formed in semiconductor chips, the elements are available in small size and weight and at reasonable costs. The elements are electrically stable and can be drive with a low voltage.

The remote control apparatus according to the present invention enables to move a specified position indicated by a cursor or the like on a display screen by means of spatially moving a transmission block grasped by a hand. Such an operation is similar to the every day action pattern of human beings and the remote control apparatus can easily be operated even by a new user who has not training in the operation.

Moreover, function selection which has conventionally been carried out at the remote control side can be carried out by selecting functions through a selection menu displayed on the display block by using the aforementioned remote control apparatus. This simplifies the operation of the remote control apparatus, for example, enabling to select a function by pressing a single pushbutton.

Furthermore, the aforementioned operation menu can be displayed on a large display screen such as a CRT, liquid crystal screen, and LED, thus enabling to more visually recognize the selection operation than selecting several pushbuttons on a conventional remote control apparatus.

By converting an output of the aforementioned remote control apparatus into a signal of a remote control unit dedicated to apparatuses in market, it is possible to include various apparatuses such as a television apparatus, a video tape recorder, a video disc player, a CD player, and a video game apparatus into a system using this remote control apparatus.

Moreover, the remote control apparatus according to the present invention employs a one-dimensional pickup element as a light receiving block for detecting a three-dimensional position of a transmission block. This enables to reduce the size and weight of the apparatus as well as to reduce the production costs. Since a position in a three-dimensional space can be detected, for example, in a three-dimensional video game, this remote control apparatus be used instead of a conventional joystick, as a pointing device for specifying a position in a virtual space.

What is claimed is:

1. A position detection apparatus comprising:

light receiving means consisting of only one lens in operational association with at least two one-dimensional light receiving elements arranged in different directions from each other, wherein the one lens receives a light injected from a light source and converges the light to a spot in an area of the light receiving elements whereupon the light receiving means generates a position output if the spot is directly on any one of the light receiving elements and also if the spot is not directly on any one of the light receiving elements; and position detection processing means for detecting a two-dimensional position of said light source according to the position output from said light receiving means.

2. A position detection apparatus as claimed in claim 1, wherein said one-dimensional light receiving elements are arranged so as to intersect each other at a right angle.

3. A position detection apparatus as claimed in claim 1, wherein one of said one-dimensional light receiving elements is divided into two equal portions so as to sandwich the center of the other light receiving element with a right angle, forming a cross-shaped configuration as a whole.

4. A position detection apparatus as claimed in claim 1, wherein said light receiving means includes three or more than three one-dimensional light-receiving elements in which at least two elements are arranged in different directions from each other; and said position detection processing means detects a three-dimensional position of said light source means according to an output signal of said light receiving means.

5. A position detection apparatus as claimed in claim 1, wherein said one-dimensional light receiving elements are made from one of CCD image pickup elements, BBD image pickup elements, and MOS image pickup elements.

6. A remote control apparatus comprising:

a transmission block having a light source for emitting a light and an ON/OFF switch for turning on and off said light source;

a light receiving block having only one lens in operational association with at least two one-dimensional light receiving elements arranged in different directions from each other, wherein the one lens receives the light emitted from said transmission block and converges the light to a spot in an area of the light receiving elements whereupon the light receiving means generates a position output if the spot is directly on any one of the light receiving elements and also if the spot is not directly on any one of the light receiving elements;

a position detection processing block for detecting a two-dimensional position of said transmission block according to the position output from said light receiving block; and a display block for displaying on a display screen the two-dimensional position of said transmission block detected by said position detection processing block.

7. A remote control apparatus as claimed in claim 6, wherein said light receiving block has three or more than three one-dimensional light receiving elements, at least one of which elements is arranged in a different direction from the other elements; and said position detection processing block detects a three-dimensional position of said transmission block according to an output signal from said light receiving block.

8. A remote control apparatus as claimed in claim 6, wherein said position detection processing block detects a maximum point of the amplitude of the output signal from said light receiving block.

* * * * *